2,807,313
BACK AND HEAD REST
Samuel Kaufman, Chicago, Ill.
Application November 30, 1955, Serial No. 550,055
3 Claims. (Cl. 155—174)

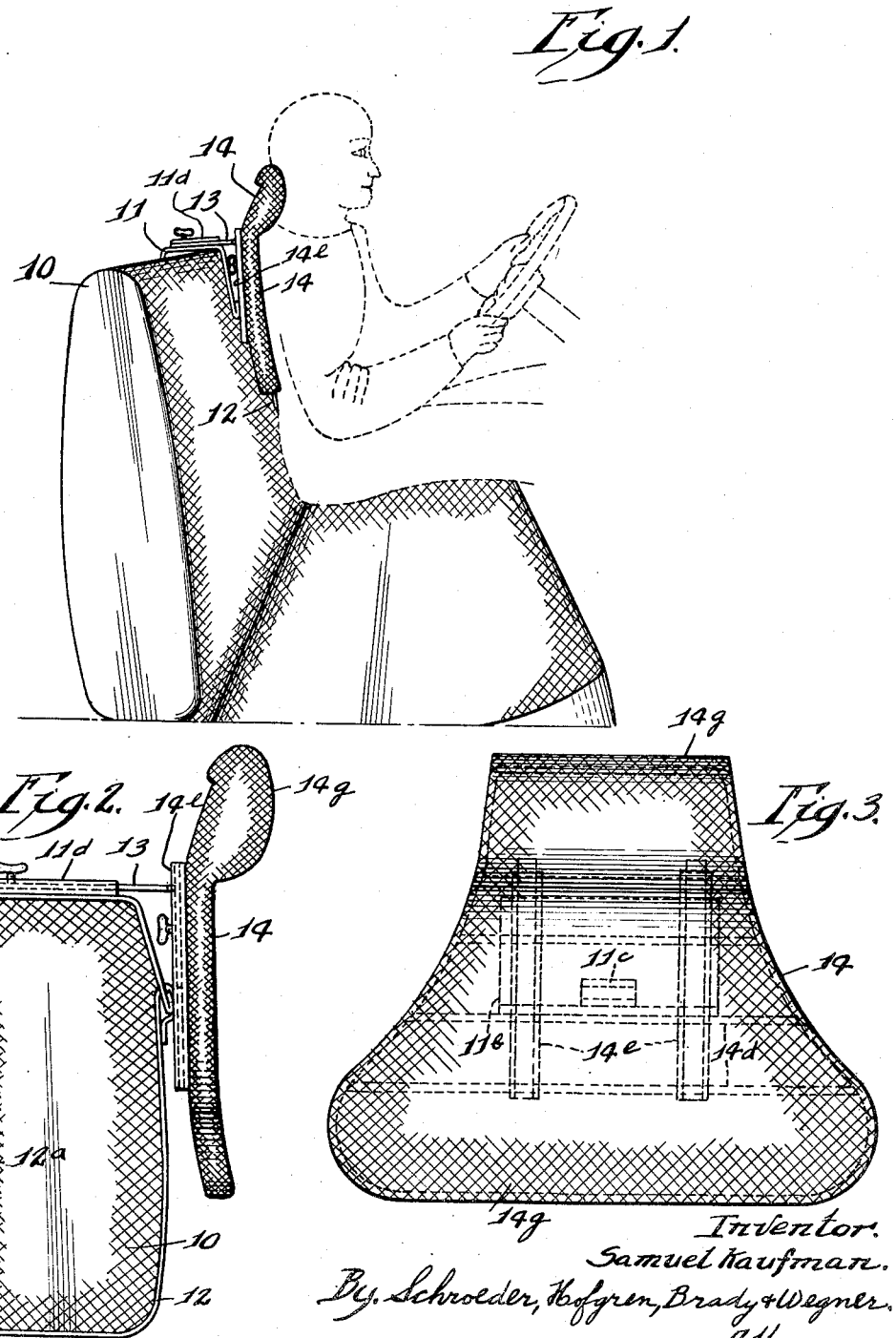

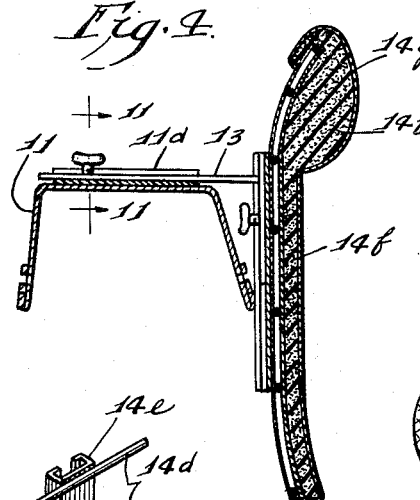
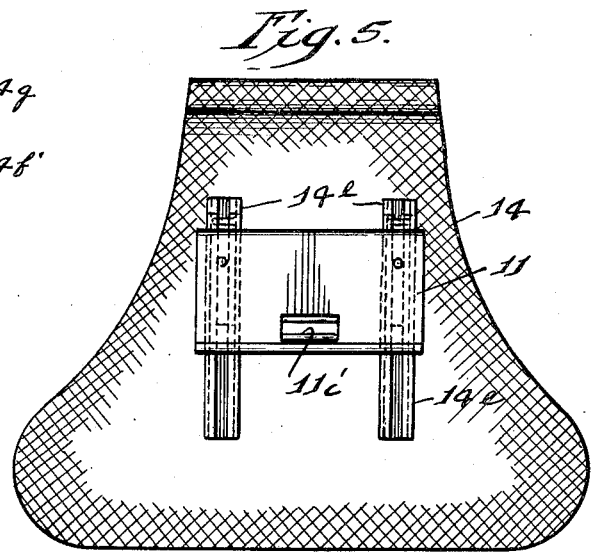
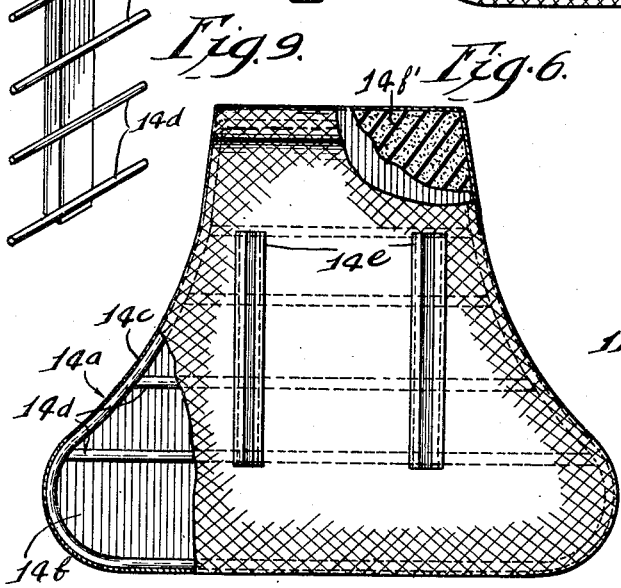
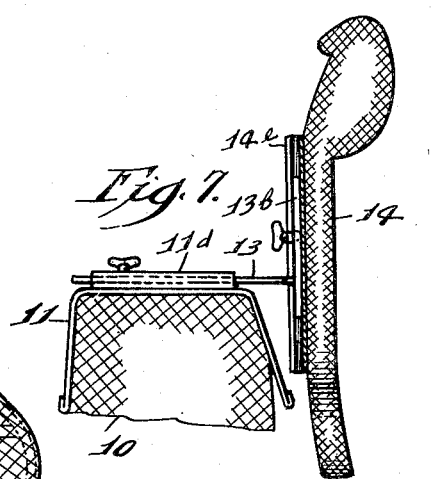
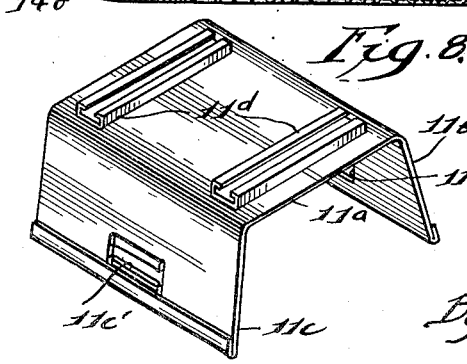
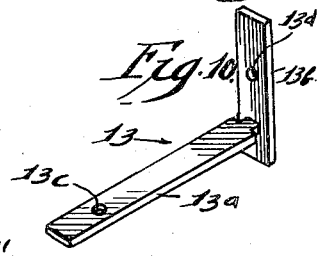
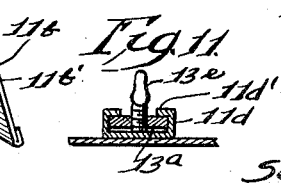
Inventor:
Samuel Kaufman
By Schroeder, Hofgren, Brady & Wegner
Attorneys United States Patent Office 2,807,313
Patented Sept. 24, 1957

This invention relates to a back and head rest and in particular to an adjustable back and head rest for use in automotive vehicles.

Fatigue of the back and neck muscles of the driver often occurs as the result of long drives in automotive vehicles such as automobiles and trucks. This is often due to the imperfect support provided to these muscles by the normal automotive vehicle seat. To alleviate this condition many drivers utilize make-shift supports such as cushions placed between the person's back and the back of the vehicle seat. While such cushions provide some relief to the fatigue of the driver's back muscles, they do not provide a truly firm support capable of properly supporting the back and neck muscles of the driver.

Another undesirable feature of the ordinary automotive vehicle seat is that the top of the back thereof does not extend sufficiently upwardly to offer support to the back of the driver's head, thus, should the driver's vehicle be struck forcibly from the rear, a "whiplash" effect occurs wherein the driver's head is snapped back rearwardly over the top of the seat back. While safety devices such as seat belts are becoming increasingly more common in use with automotive vehicles, such devices do not afford any protection relative to this particular "whiplash" effect.

A principal feature of this invention is the provision of a new and improved back and head rest for use in automotive vehicles.

Another feature is the provision of a new and improved back and head rest adapted to be removably secured to the back of any automotive vehicle seat to afford firm support of a driver's back and neck muscles.

A further feature of the invention is the provision of such a back and head rest having a rigid member arranged to be fixedly secured around the top of the vehicle seat back and a support pad carried by the member so as to be adjustably positionable, both vertically and horizontally.

A still further feature is the provision of such a back and head rest wherein the pad is supported rearwardly of the driver's neck to preclude effectively "whiplashing" of the driver's head.

Yet another feature of the invention is the provision of a back and head rest having a member adapted to be secured fixedly over the top of the vehicle seat back, an L-shaped support bar having one leg thereof extending horizontally and adapted to be fixedly secured to the member in any one of a plurality of horizontal positions, a pad having a portion for supporting the driver's back and a portion for supporting the driver's head adjacent the driver's neck, and means for fixedly securing the pad to a vertically extending leg of the support bar in any one of a plurality of vertical positions.

Yet a further feature is the provision of a support bar as described in the above paragraph wherein the vertically extending leg may be arranged to extend alternatively upwardly and downwardly from the plane of the horizontally extending leg, thereby to double the effective range of vertical adjustability of the pad.

Other features and advantages of the invention will be apparent from the following description taken in connection with the accompanying drawings wherein:

Fig. 1 is a perspective view of a back and head rest embodying the invention attached to a vehicle seat back and with a phantom showing of a driver and steering wheel of the vehicle;

Fig. 2 is a side elevational view of the back and head rest attached to a vehicle seat back;

Fig. 3 is a front elevational view of the back and head rest device;

Fig. 4 is a vertical sectional view of the device with the vertical leg of the support extending downwardly;

Fig. 5 is a rear elevational view of the device;

Fig. 6 is a rear elevational view of the pad with portions thereof broken away;

Fig. 7 is a side elevational view of the device mounted on a vehicle seat back and with the vertical leg of the support extending upwardly;

Fig. 8 is a perspective view of the channel member;

Fig. 9 is a perspective view of a pad slideway and with the pad cross members shown fragmentarily;

Fig. 10 is a perspective view of a support member; and

Fig. 11 is a sectional view taken approximately along the line 11—11 of Fig. 4.

As shown in the exemplary embodiment of the invention disclosed in the drawings, the back and head rest is adapted to be mounted on the back 10 of an automotive vehicle seat and forms an upward continuation thereof. The back and head rest comprises a plate or channel member 11 which is secured over the top of the seat back by means of a strap 12. Secured to member 11 so as to be horizontally positionable, is an L-shaped support bracket 13. Secured to bracket 13 so as to be vertically positionable relative thereto, is a pad 14. Pad 14 is arranged to provide a firm and proper support for the back and neck muscles of the vehicle driver, with the adjustability of pad 14 relative to bracket 13 and bracket 13 relative to member 11 providing desirable positioning of the pad to accommodate the driver's person.

Channel member 11 comprises a generally U-shaped, trough-like plate having a horizontal portion 11a, a depending front portion 11b and a depending rear portion 11c. Slots 11b' and 11c' are provided in the front and rear portions respectively for attachment thereto of the ends of straps 12. Fixedly secured on the top of horizontal portion 11a is a pair of parallel, spaced slideways 11d each having a T-slot cross section and extending laterally relative to the planes of the depending portions 11b and 11c.

Strap 12 may be made discontinuous to allow it to be passed between the bottom of the vehicle seat back 10 and the rear of the vehicle seat cushion. A buckle 12a of any suitable construction may be provided to allow tightening of the strap and the firm securing of the channel member 11 over the top of the seat back 10. Thus, channel member 11 may be readily removed or installed whenever desired, with sidewise adjustment of the positioning thereof relative to seat back 10 being readily obtained. Further, while channel member 11 is firmly secured to seat back 10, it should be understood that the yieldable construction of the seat back allows a degree of movement of the channel member about the top thereof.

As best seen in Fig. 10, each support bracket 13 comprises a horizontal leg 13a and a vertical leg 13b extending perpendicular to and from one end of leg 13a. Leg 13a is carried slidably in slideway 11d and is provided intermediate its ends with a threaded hole 13c. Securing means such as thumb screw 13e is provided for locking leg 13a in the slideway. As best seen in Fig. 11, this is accomplished by the advancement of thumb screw 13e through threaded hole 13c until the end of the thumb screw abuts the bottom of slideway 11d, forcing leg 13a upwardly whereby it is clamped against the underside of overhanging flanges 11d' of the slideway. In this manner brackets 13 may be fixedly secured in any one of a plurality of positions in a horizontal plane.

Reference now being had more specifically to Figs.

3 and 6, pad 14 is seen to comprise a relatively rigid support, illustratively disclosed as including a framework 14a and a backing sheet 14b firmly secured to the framework. Framework 14a may comprise a peripheral element 14c and a plurality of spaced, horizontally extending elements 14d. As best seen in Figs. 6 and 9, a pair of parallel, spaced slideways 14e are fixedly secured to the horizontal elements 14d so as to extend vertically and in alignment with slideways 11d of channel member 11. The construction of slideways 14e is similar to that of slideways 11d, and they are adapted to receive slidably legs 13b of support bracket 13. Thumb screws 13e are provided to cooperate with threaded holes 13d and secure slideways 14e to the legs 13b in any one of a plurality of vertical positions.

It is to be understood that my invention comprehends a support bracket structure wherein the legs thereof are not restricted to a perpendicular or horizontal-vertical configuration, but may be at any desirable and suitable angle for positioning the pad properly. Further, the angle between the legs may be made adjustable by the inclusion of suitable adjustable clamping means of any of the types well known in the art. It is desired however that the clamping means be rugged so that pad 14 may be held firmly and securely in position.

A yieldable cushion 14f forms the front part of pad 14 and as illustratively shown in Fig. 4 may comprise a body of sponge rubber secured to backing sheet 14b by means such as gluing. The upper portion 14f' is enlarged somewhat so as to extend forwardly in conformity with the configuration of the rear of the driver's shoulders and neck to yieldably support the head. If desired, a covering sheet 14g may be placed around the framework 14a, sheet 14b, and cushion 14f.

As best seen in Figs. 4 and 7, the range of vertical adjustment of pad 14 is substantially increased by the adaptability of support bracket 13 to be secured to channel member 11 with leg 13b extending downwardly (as in Fig. 4) or upwardly (as in Fig. 7). Such structure precludes undesirable and unsightly projection of leg members upwardly away from the pad, as would be had with a T-shaped bracket should the pad be mounted on the lower leg of the T crossbar.

The back and head rest of the invention is readily installed by securing channel member 11 over the top of seat back 10 by means of strap 12. Support brackets 13 are then positioned in slideways 11d. Pad 14 is positioned as desired on brackets 13 and locked in position by securing bracket legs 13b to slideways 14e and securing legs 13a by means of thumb bolts 13e. As seen in Fig. 2, pad 14 is thus positioned in front of the seat back 10. When the driver rests his back and head against the pad, as seen in Fig. 1, the yielding construction of the top portion of seat back 10 allows a slight repositioning of the rest so that the lower end of the pad may abut the front of the seat back. This provides additional support of the pad to assure its providing, together with the lower portion of the seat back, a firm support for the driver's back and head. Further, as the pad is supported directly behind the driver's neck by bracket 13 as seen in Figs. 2 and 7, "whiplash" is effectively precluded.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. For use with an automobile seat back, a back and head rest of the character described, comprising: a U-shaped channel member having a pair of spaced, parallel elongated guideways, and having a pair of slots, one each in each leg of the channel member; strap means having ends receivable in said slots for securing said channel member over the top of the seat back with said guideways extending horizontally; a pair of support bars each having an elongated portion and a leg extending perpendicularly from one end of said elongated portion; screw means carried by said elongated portions for fixedly securing in any one of a plurality of positions in a horizontal plane the elongated portions of the support bars in said guideways; a pad member having an integral back and head support and a pair of spaced, parallel elongated guideways; and screw means carried by said legs for fixedly securing the legs in the pad member guideways whereby the pad member is held in any one of a plurality of positions in a vertical plane, with the means for securing the back and head rest to the seat back permitting positioning thereof whereby a lower portion of the pad member may abut the seat back to provide additional support of the pad member.

2. For use with an automobile seat back, a back and head rest of the character described, comprising: a U-shaped channel member having a pair of spaced, parallel, elongated guideways; a strap means associated with said channel member for securing the channel member over the top of the seat back with said guideways extending horizontally and opening upwardly; a support bar for each guideway having an elongated portion and a leg extending perpendicularly from one end of said elongated portion; adjustable means carried by said elongated portion for fixedly securing in any one of a plurality of positions in a horizontal plane the elongated portion of each support bar in said guideways, said elongated portion being arranged to be received in the guideways with said leg extending alternatively vertically upwardly or vertically downwardly and spaced from the channel member sufficiently to clear the automobile seat back in either of its alternative positions; a pad member having an integral back and head support and a pair of elongated guideways aligned with said channel member guideways; and adjustable means associated with the leg of each support bar for fixedly securing the legs in the pad member guideways whereby the pad member is held in any one of a plurality of positions in a vertical plane.

3. For use with an automobile seat back, a back and head rest of the character described, comprising: a channel member having at least one elongated guideway; a strap means associated with said channel member for securing the channel member over the top of the seat back with said guideway extending horizontally and opening upwardly; a support bar for each guideway having an elongated portion and a leg extending perpendicularly from one end of said elongated portion; adjustable means associated with said elongated portion for fixedly securing in any one of a plurality of positions in a horizontal plane the elongated portion of the support bar in said guideway, said elongated portion being arranged to be received in the guideway with said leg extending alternatively vertically upwardly or vertically downwardly and spaced from the channel member sufficiently to clear the automobile seat back in either of its alternative positions; a pad member having an integral back and head support and an elongated guideway; and adjustable means associated with said leg for fixedly securing the leg in the pad member guideway whereby the pad member is held in any one of a plurality of positions in a vertical plane.

References Cited in the file of this patent

UNITED STATES PATENTS

| | | |
|---|---|---|
| 18,998 | Waters | Dec. 29, 1857 |
| 470,255 | Petrie | Mar. 8, 1892 |
| 1,597,355 | Fussell | Aug. 24, 1926 |
| 2,560,925 | Brown | July 17, 1951 |
| 2,624,397 | Aubin | Jan. 6, 1953 |

FOREIGN PATENTS

| | | |
|---|---|---|
| 284,265 | Germany | May 17, 1915 |